United States Patent [19]
Zoleta

[11] 3,835,369
[45] Sept. 10, 1974

[54] METHOD AND APPARATUS FOR GENERATING ELECTRICAL VOLTAGE OF AMPLITUDE VARYING WITH TIME

[76] Inventor: Jose C. Zoleta, 90-39 56th Ave., Elmhurst, N.Y. 11373

[22] Filed: Mar. 16, 1973

[21] Appl. No.: 342,146

[52] U.S. Cl............................. 323/44 F, 321/8 CD
[51] Int. Cl. ............................................ H02m 7/42
[58] Field of Search............ 307/17, 306; 321/8 CD, 321/34, 44; 323/6, 44 F, 48

[56] References Cited
OTHER PUBLICATIONS
Hanrahan, The Role of Inductance in Superconducting Energy Storage Systems, Proceedings of the IEEE, Vol. 54, pgs. 67, 68, Jan. 1966, TK570017.

Primary Examiner—A. D. Pellinen
Attorney, Agent, or Firm—Watson Leavenworth Kelton & Taggart

[57] ABSTRACT

Voltage generators in which the primary winding of a superconductive transformer is excited by momentary connection to a source of direct current and is further energized responsively to voltage induced in the secondary winding by cyclic changing of primary winding current, for compensating losses internal to the transformer and associated circuitry. Control of such further energization and maintenance of transformer winding current below the current level at which the transformer windings are rendered normal are effected by superconductive current-interrupting devices.

19 Claims, 3 Drawing Figures

3,835,369

METHOD AND APPARATUS FOR GENERATING ELECTRICAL VOLTAGE OF AMPLITUDE VARYING WITH TIME

FIELD OF THE INVENTION

This invention relates generally to electric power generation and more particularly to the generation of electrical voltage of amplitude varying with time, for example, alternating-current (a-c) voltage.

BACKGROUND OF THE INVENTION

Current ecological interests are quite poorly served by present-day energy conversion techniques wherein substantially all generated electrical energy is derived ultimately from fossil fuels with a quite minor amount being derived hydro-electrically or by fusion of uranium. Apart from the direct anti-ecological consequence thereof, i.e., atmospheric contamination, such practice is also notably wasteful, being accompanied by substantial heat loss. In substitution for such practice, the present invention looks toward high efficiency energy conversion with little, if any, accompanying atmospheric contaimination. To this end, the invention seeks to solve energy demands through the use of superconductive materials and related apparatus.

Despite discovery of the phenomenon of superconductivity more than one half century ago, practical use of the phenomenon has been quite limited, particularly in connection with power-related ends. Direct-current (d-c) devices, such as motors and solenoids, are known wherein superconductive inductors are maintained in an environment of temperature below the critical temperature at which the materials thereof are superconducting, and are then energized momentarily and thereafter short-circuited. The current induced on momentary energization persists, thereby providing an electromagnet whose operating power requirement is simply the power required by the refrigerating unit (cryostat). Accordingly, these devices exhibit a high degree of operational efficiency. In respect of a-c devices, applicant is presently aware only of generators which are superconductive to the extent that the fields thereof may be provided by superconductive electromagnets. These generators, while capable of high efficiency operation, have evident shortcomings in their need for rotative armatures of substantial size.

SUMMARY OF THE INVENTION

It is an object of the present invention to provide improved superconductive generators of time-varying voltage and improved methods for generating time-varying voltage.

In attaining the foregoing and other objects, the invention at hand incorporates apparatus comprising a transformer having superconductive primary and secondary windings, circuit means cooperative with the primary winding for inducing current therein and conforming such induced current to amplitudes varying with time and a cryostat for maintaining the superconductive elements involved below their critical temperatures. Since primary winding current is time-varying, time-varying or a-c voltage is made available for use at the terminals of the secondary winding. The methods of the invention are embodied in such apparatus and effectuate cyclic change in the current flowing through a superconductive inductor requiring external power input only in respect of cryostat energization and momentary initial connection of the inductor to a source of d-c voltage.

The foregoing and other objects and features of the invention, relating to such measures as protection of the generator and internal power loss compensation, will be evident from the following detailed description of preferred embodiments thereof and practices thereunder and from the drawings wherein like references numerals indicate like parts throughout.

DESCRIPTION OF THE PREFERRED EMBODIMENT AND PRACTICE

Figure 1:
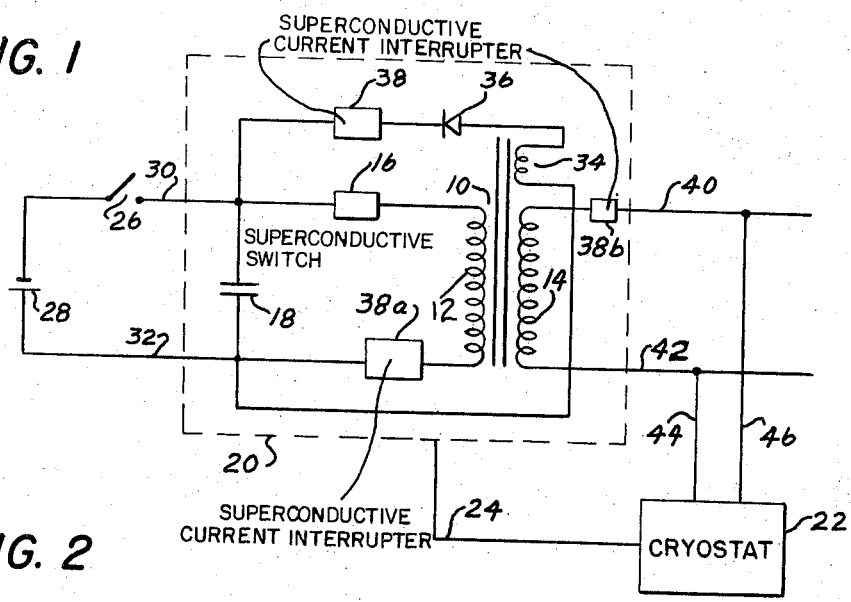
FIG. 1 illustrates an embodiment of a voltage generator in accordance with the invention wherein capacitive circuit means are cooperative with a transformer primary winding.

Referring to FIG. 1, transformer 10 includes primary winding 12 and secondary winding 14, both windings being comprised of superconductive material, preferably of type II, defined widely in published literature, for example, at pages 126–132 of the publication "Materials for Conductive and Resistive Functions," published in 1970 by Hayden Book Company, Inc. Type II superconductors, such as Nb/Zr, Nb/Ti, $Nb_3Sn$ and $V_3Ga$, have higher current density capability in contrast to the type I superconductors, and thus lend themselves to usage in superconducting solenoids and transformers. The windings are desirably formed as a composite for stabilization. Where the windings are of $Nb_3Sn$, they are desirably stabilized, for example, by embedding the windings in another material, e.g., copper, stainless steel, aluminum, etc. Said stabilizing material is not superconductive, but is a good conductor, at the low temperatures involved. Accordingly, if the superconductive material of the winding should go normal, i.e., where its critical parameters of current, magnetic field or temperature are exceeded, the stabilizing material conducts current and is present in quantity sufficient to minimize joule heating.

Series-connected across the terminals of primary winding 12 are switch 16 and capacitor 18. Switch 16 may comprise any superconductive switch. By way of example, switch 16 may be in cryotron form comprising a stabilized superconductor, as in the case of windings 12 and 14, encircled by a superconductive control winding. The control winding is comprised of a material having a higher critical field strength than the element controlled thereby. A slight increase in the current through the control winding will increase its magnetic flux and hence render the controlled element normal, i.e., resistive. A decrease of current in the winding lessens its flux and the controlled element reverts to its superconductive state. Critical parameters of the controlled element other than its critical magnetic field may be employed in this switching operation. Capacitor 18 is comprised of superconductive material and is selected of capacitance value which, taken with the inductance of primary winding 12, provides oscillation of preselected periodicity.

The components discussed to this point are desirably contained in a multi-stage insulating vessel as indicated schematically by the reference numeral 20, the interior of which is maintained at a temperature below the lowest critical temperature of the materials comprising these components, such refrigeration being provided by a cryostat 22, whose output is applied to the vessel as shown schematically by line 24. Cryostat structure is also defined widely in published literature, such as the publication "Cryogenics," published in 1964 by J. B. Lippincott Co. A flux pump may be employed in lieu of multi-staging in attaining desired temperature in vessel 20.

Switch 26 and a d-c source 28 may be series-connected across capacitor 18 by lines 30 and 32.

In operation of the system of FIG. 1 discussed to this point, with switch 16 open, switch 26 is closed to permit capacitor 18 to be charged to the terminal voltage of source 28. Thereafter, switch 26 is opened. With vessel 20 interior maintained at a temperature at or below the critical temperature for all components contained therein, switch 16 is then closed. On this event, capacitor 18 discharges through winding 12 and, since this winding comprises a super-conductive inductor, the complete analog of the capacitor, the winding stores the energy initially stored in the capacitor. On dishcarge of capacitor 18, winding 12 recharges the capacitor, giving rise to an enduring current having an amplitude changing with passage of time. Secondary winding 14 accordingly provides a substantially sinusoidal output voltage.

While the oscillatory system now under discussion generates an enduring current, such current cannot persist indefinitely as in the known superconductive solenoid since internal losses exist which are attendant on cyclic current change. Thus, some dielectric loss is presumed to occur in capacitor 18. Hysteresis loss is also present and some flux jumping may be presumed to occur. These losses may be further increased by heating losses if load circuit parameters were not selected such that the maximum current flow in primary winding 12 would always be less than the short sample critical current for the material comprising winding 12 and lessened further with due respect to the phenomenon generally known as "degradation" in superconductive inductors.

In providing for persistency of the discussed oscillatory current, the invention introduces in the FIG. 1 system regenerative feedback means operative to compensate for the aforementioned and other losses. To this end, a feedback winding 34, formed as a stabilized composite, is inductively coupled to primary winding 12 and connected across capacitor 18 through rectifying diode 36 and current-interrupting element 38. Two limits apply as respects the operation of the feedback means. On the one hand, the feedback energy must be in amount not less than the losses internal to the system. On the other hand, the feedback means must not have the effect of increasing the amplitude of the oscillatory current above the critical current of any superconductor in the system.

Current-interrupting element 38 of the invention satisfies these limits. This element is comprised of a superconductive material, such as the material comprising winding 34, and is of cross-sectional area, less than that of winding 34, such that the element becomes normal, by reason of current exceeding its critical current, at that point in the feedback half-cycle defined by rectifying diode 36 at which current in amount compensatory of internal losses has been fed back to capacitor 18 and winding 12. Element 38 need be non-conductive when rendered normal at such point in the feedback half-cycle. Accordingly, the element may comprise either an impure type I superconductor or a type II superconductor. The element may be either stabilized or unstabilized. Where stabilized, the element need be stabilized by stabilizing material which is non-conductive at a current level less than the current occurring at such feedback half-cycle point. Thus, the stabilized material may comprise simply a non-conductive material, for example, glass, or a superconductor of lower critical current parameter than the material stabilized thereby. In respect of the use of glass, reference may be had to the publication "Scientific American", February 1971, page 47 for details relative to construction of glass-stabilized superconductors.

By the foregoing provision, the FIG. 1 system is self-compensating and will evidence persistent oscillatory current. A load connected across lines 40 and 42 derives power indefinitely if cryostat 22 maintains the interior of vessel 20 at the aforementioned temperature and if the load does not draw current in excess of the lowermost critical current of the system components. The cryostat may itself be connected by lines 44 and 46 as a load on the FIG. 1 system. As will be appreciated, the cryostat need be initially energized by output power generating means other than the oscillatory system of FIG. 1.

As set forth in various published literature, there exists a great present need for a superconductive circuit breaker which is operative to hastily interrupt superconductive circuits on occurrence of load current which would render normal such circuit means as superconductive transformers and the like. Where load current cannot be maintained at a level below the lowermost critical current of the FIG. 1 system discussed to this juncture, the system has like circuit breaker need. In fulfillment of such need, the invention provides for the inclusion in series circuit with primary winding 12 of current-interrupting element 38a, constructed as in the case of element 38. Element 38a is of the same material as is its series-connected superconductor, namely, winding 12, and is of lesser cross-sectional area. Accordingly, the element defines a lesser critical current than does winding 12 and, should load current surge to the critical current of element 38a, the oscillatory circuit of FIG. 1 is broken and thus prohibited from experiencing loss of energy through heat generation in winding 12. A like current-interrupting element 38b may also be included in series circuit with secondary winding 14.

In design, elements 38, 38a and 38b are desirably of cross-sectional area substantially less, e.g., 50 percent, than the cross-sectional area of their associated series connected superconductors, windings 34, 12 and 14, respectively. As such, the elements define critical currents substantially less e.g., 50 percent, than the critical currents of the windings.

Figure 2:
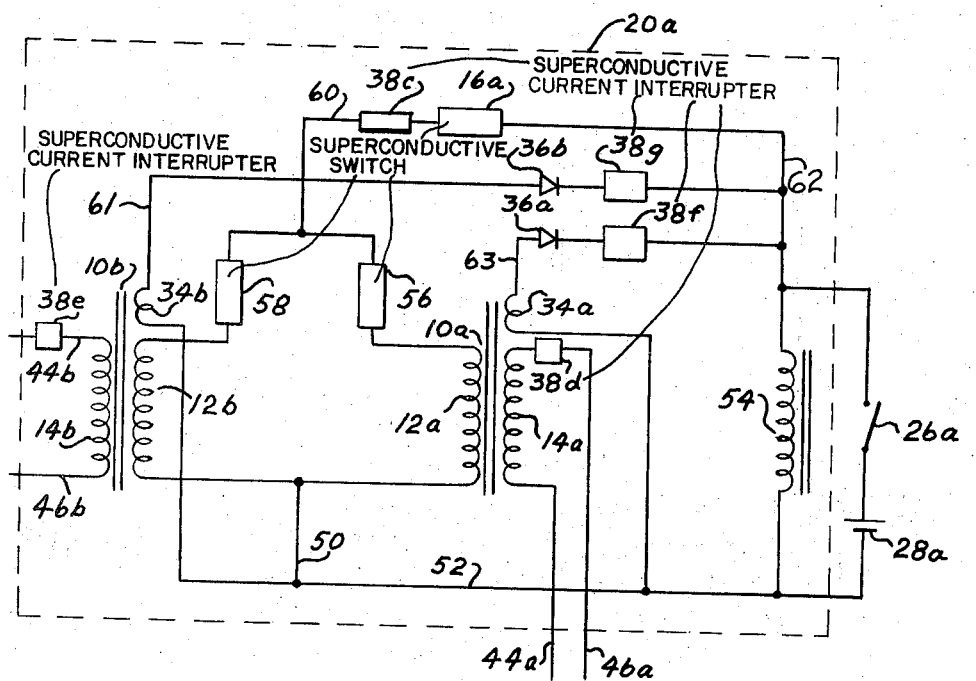
FIG. 2 illustrates a further embodiment of a voltage generator in accordance with the invention wherein inductive and switching circuit means are cooperative with transformer primary windings.
Figure 2D:
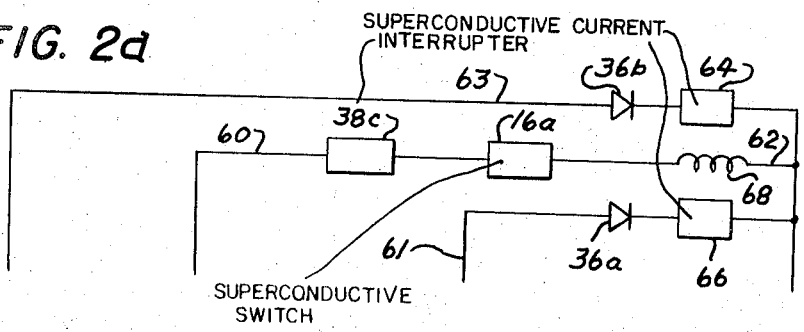
FIG. 2a illustrates a modified version of the FIG. 2 generator embodiment.

In providing a persistent current of amplitude varying with time in a transformer primary winding for effecting a-c voltage generation, the subject invention is of course not limited to pre-charged capacitive circuit means embodied in FIG. 1. One variation thereof is illustrated in FIG. 2, the system of which employs inductive and switching circuit means in association with a transformer primary winding. Referring now to FIG. 2, transformers 10a and 10b define superconductive primary windings 12a and 12b and superconductive secondary windings 14a and 14b. Transformer output voltage is made available across lines 44a–46a and 44b–46b. First terminals of primary windings 12a and 12b are connected in common to line 50 and then by line 52 to one terminal of inductor 54. Second terminals of primary windings 12a and 12b are connected separately to superconductive switches 56 and 58. These switches are each connected to line 60 and then through current-interrupting element 38c, superconductive switch 16a and line 62 to the other terminal of inductor 54. Superconductive switches 56, 58 and 16a may be in cryotron form as above-discussed in connection with superconductive switch 16, all such switches having separate control windings. On energization of the windings, the switches are opened.

Inductor 54 is pre-charged, i.e., supplied with initial energizing current by d-c voltage supply 28a on momentary closure of switch 26a and, where all of the now-discussed components are subjected to temperature at or below the lowermost critical temperature thereof by cryostat input to vessel 20a, first or second superconductive loops are provided in the FIG. 2 system depending upon the states of switches 56 and 58.

When switches 57 and 16a are closed, a first loop is defined comprising inductor 54, line 62, switch 16a, element 38c, line 60, switch 56, primary winding 12a and lines 50 and 52. When switches 58 and 16a are closed, a second loop is defined, comprising inductor 54, line 62, switch 16a, element 38c, line 60, switch 58, primary winding 12b and lines 50 and 52. These two loops are operative alternately where the control windings of cryotron-type switches 56 and 58 are alternately energized.

In operation of the FIG. 2 system discussed to this juncture, and with initial conditions providing a charged inductor 54 and the control winding of switch 58 energized, an enduring current flows in the first loop upon closure of switch 16a. At the point at which the control winding of switch 56 is energized and the control winding of switch 58 is deenergized, the current in such first loop decays to zero and the second loop becomes operative. In the course of such decay of first loop current, flux change occurs in transformer 10a and a voltage of time-varying amplitude is available across lines 44a and 46a. In this connection, it is to be noted that switch 56 comprises a superconductive element which is resistive when rendered normal, thereby defining a decay period. Such voltage generation is effected on each occurrence of current decay in either of the superconductive loops and the voltage thus made available may be controlled in frequency by controlling the frequency of operation of switches 56 and 58. Current-interrupting elements 38d and 38e may be included in series circuit with windings 14a and 14b.

The system of FIG. 2 is presumed to have internal losses as in the case of the FIG. 1 system and further losses attendant upon the periodic resistive nature of switches 56 and 58. Accordingly, regenerative feedback is induced in the FIG. 2 system through the use of additional windings 34a and 24b, current-interrupting elements 38f and 38g and rectifying diodes 36a and 36b respectively in lines 61 and 63. Such feedback means are constructed as in the case of that of FIG. 1 and are connected in parallel across inductor 54. While two such feedback means are illustrated in the FIG. 2 system for purposes of symmetry, internal loss compensation may readily be effected by use of a single feedback means. Also, a pair of rectifying diodes connected in inverse parallel manner may be used in place of each of diodes 36a and 36b to provide for improved rectification. Other elements 38 may be introduced as desired in the FIG. 2 system for protection of the generator.

In a modified version (FIG. 3) of the FIG. 2 generator, cryotron-form switches are substituted for current-interrupting elements 38f and 38g in the feedback means. The controlled elements 64 and 66 of such switches are in series circuit in lines 61 and 63 respectively and associated with a common control winding 68 in series circuit in line 62. On current of preselected magnitude in line 62, i.e., at which fedback energy is compensatory of internal losses, winding 68 generates flux of magnitude rendering elements 64 and 66 normal and non-conductive. Elements 64 and 66 are constructed as above-discussed in connection with element 38.

As is now made evident by the foregoing diverse types of apparatus for achieving the objects of the subject invention, the methods of the invention may be implemented by various means providing for the energization of an inductive winding rendered and maintained superconductive, for the periodic change of current amplitude therein, and for the further energization of the inductive winding responsive to such current amplitude change for purpose of loss compensation. A second winding is inductively coupled to the winding in which current amplitude change is effected for generating time-varying voltage.

State of the art techniques in superconductive transformer winding should be respected in constructing generators in accordance with the invention. Thus, the ratio of primary winding turns to secondary winding turns should be unity and the windings should be interleaved to minimize flux leakage. The transformer may be constructed without a core but preferably is constructed with a core comprised of such as AISI type M-14 core material. In the interests of energy conservation, the core is desirably outside of the refrigerated vessel but may be included therein. While the invention has been disclosed in connection with single-phase time-varying voltage generation, polyphase voltage generation is within the contemplation of the invention and could involve mere pluralization of the invention disclosed above, with the several participating generators excited such that their output voltages are phase-displaced from one another as desired. While the foregoing embodiments have relied particularly on cryotron-form superconductive switches, it will be appreciated that any superconductive switch may be employed. Particularly where output demand is substantial, these switches may involve SCR and like semiconductive switch devices. The amplitude of the time-varying voltage generated in accordance with the invention may be adjusted by various techniques, for example, by selection of the terminal voltage of sources 28, 28a, by use of voltage dividers or variable resistances.

Various changes and modifications may be introduced in the foregoing without departing from the invention. Accordingly, the particularly disclosed apparatus and methods are intended in a descriptive and not in a limiting sense. The true spirit and scope of the invention is defined in the following claims.

What is claimed is:

1. A method for generating voltage of time-varying amplitude, comprising the steps of:
   a. inductively coupling to each other first and second inductive windings, each comprised of material capable of being rendered superconductive;
   b. rendering and maintaining said windings superconductive;
   c. energizing said first inductive winding to induce current therein of predetermined amplitude less than the current amplitude at which said first inductive winding is rendered normal and periodically changing the amplitude of current in said first inductive winding, thereby inducing a voltage of time-varying amplitude in said second inductive winding; and
   d. maintaining the maximum amplitude of such current in said first inductive winding at said predetermined amplitude by further energizing said first inductive winding with current derived responsively to said current amplitude changing therein.

2. The method claimed in claim 1 wherein said step (b) is practiced in part by connecting in series circuit with said first inductive winding an element of lesser cross-sectional area than said first inductive winding and comprised of material capable of being rendered superconductive, and non-conductive when rendered normal, and by maintaining said element at a temperature below the temperature at which said element is rendered normal.

3. The method claimed in claim 1 wherein said step (c) is practiced by connecting across said first inductive winding pre-charged capacitive means comprised of material capable of being rendered superconductive, said step (b) being further practiced on said capacitive means.

4. The method claimed in claim 1 wherein said step (c) is practiced by connecting across said first inductive winding circuit means including a pre-energized inductor and a switch connected therewith and operable to provide periodic decay of current in said first inductive winding, said inductor and said switch being comprised of materials capable of being rendered superconductive, said step (b) being further practiced on said inductor and said switch.

5. The method claimed in claim 1 wherein said step (d) is practiced in part by inductively coupling to said first inductive winding a third inductive winding comprised of material capable of being rendered superconductive, said step (b) being further practiced on said third inductive winding.

6. The method claimed in claim 5 wherein said step (d) is further practiced by rectifying current generated in said third inductive winding and applying the same to said first inductive winding in regenerative manner.

7. The method claimed in claim 6 wherein said step (d) is further practiced by discontinuing application of said current generated by said third inductive winding to said first inductive winding upon the occurrence of current of preselected maximum amplitude in said third inductive winding.

8. The method claimed in claim 7 wherein said current application discontinuing step is practiced by connecting in series circuit with said third inductive winding an element of lesser cross-sectional area than said third inductive winding and comprised of material capable of being rendered superconductive, and non-conductive when rendered normal, and by maintaining said element at a temperature below the temperature at which said element is rendered normal.

9. Apparatus for generating voltage of time-varying amplitude, comprising:
   a. a transformer having a primary winding and a secondary winding, each comprised of material capable of being rendered superconductive;
   b. first circuit means for inducing current in said primary winding of predetermined amplitude less than the current amplitude at which said windings and said first means are rendered normal and for periodically changing the amplitude of current in said primary winding, thereby inducing voltage of time-varying amplitude in said secondary winding;
   c. second means operatively responsive to such periodic current amplitude change for further inducing current in said primary winding to maintain the maximum amplitude of such current in said primary winding at said predetermined amplitude; and
   d. cryostat means for maintaining said windings and said first and second means at a temperature below the temperature at which said windings and said first and second means are rendered normal.

10. The apparatus claimed in claim 9 further including third means capable of being rendered superconductive and connected in series circuit with said primary winding for interrupting current therein of amplitude equal to a preselected amplitude less than the current amplitude at which said primary winding is rendered normal, said cryostat means maintaining said third means at a temperature below the temperature at which said third means is rendered normal.

11. The apparatus claimed in claim 10 wherein said third means comprises an element of lesser cross-sectional area than said primary winding and of material capable of being rendered superconductive, and non-conductive when rendered normal.

12. The apparatus claimed in claim 9 wherein said first means comprises pre-charged capacitive means connected across said primary winding, said capacitive means being comprised of material capable of being rendered super-conductive.

13. The apparatus claimed in claim 9 wherein said first means comprises circuit means connected across said primary winding and including a pre-energized inductor and a switch operable to provide for periodic decay of current in said primary winding, said inductor and said switch being comprised of materials capable of being rendered super-conductive.

14. The apparatus claimed in claim 9 wherein said second means includes a third inductive winding inductively coupled to said primary winding and comprised of material capable of being rendered superconductive.

15. The apparatus claimed in claim 14 wherein said second means further includes means for rectifying current generated in said third inductive winding and applying the same to said primary winding in regenerative manner.

16. The apparatus claimed in claim 15 further including fourth means for discontinuing application of said current generated by said third inductive winding to said primary winding upon the occurrence of current of preselected maximum amplitude in said third inductive winding, said cryostat means maintaining said fourth means at a temperature below the temperature at which said fourth means is rendered normal.

17. The apparatus claimed in claim 16 wherein said fourth means comprises an element of lesser cross-sectional area than said primary winding and connected in series circuit with said third inductive winding and comprised of material capable of being rendered superconductive and non-conductive when rendered normal.

18. A method for generating voltage of time-varying amplitude, comprising the steps of:
  a. inductively coupling to each other first and second inductive windings, each comprised of material capable of being rendered superconductive;
  b. connecting in series circuit with said first inductive winding switch means and circuit means, said circuit means conforming any current flowing in said series circuit to a preselected current amplitude change with time characteristic, said switch means and circuit means being comprised of material capable of being rendered superconductive;
  c. rendering and maintaining said windings, said switch means and said circuit means cuperconductive; and
  d. inducing current in said series circuit of predetermined amplitude less than the current amplitudes at which said first inductive winding, said switch means and said circuit means are rendered normal, said circuit means conforming said induced current to said preselected amplitude change with time characteristic and thereby inducing a voltage of time-varying amplitude in said second inductive winding.

19. The method claimed in claim 18 including the further step of maintaining the maximum amplitude of such current in said series circuit at said predetermined amplitude by further inducing in said series circuit current derived responsively to amplitude change of current in said series circuit.

* * * * *